March 24, 1964    E. W. MALONE    3,125,885
MECHANICAL ACCELERATION RETARDER
Filed Jan. 3, 1961    2 Sheets-Sheet 1
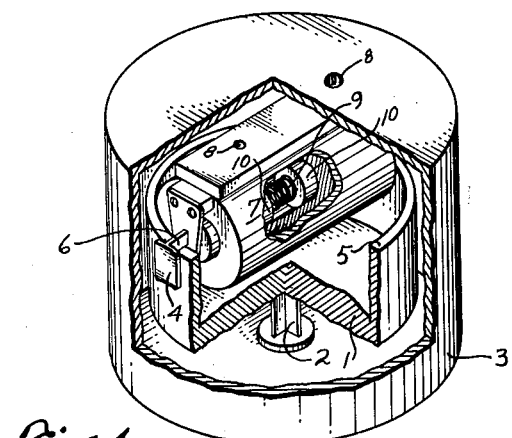
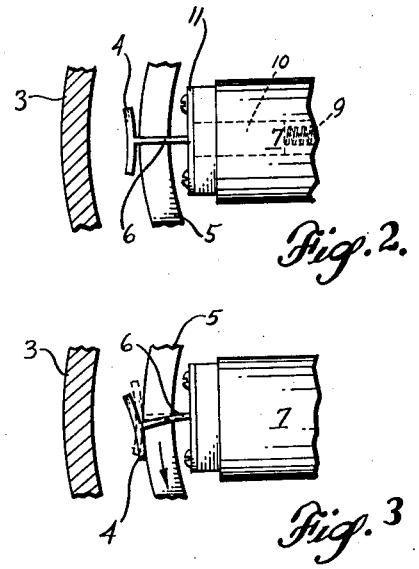
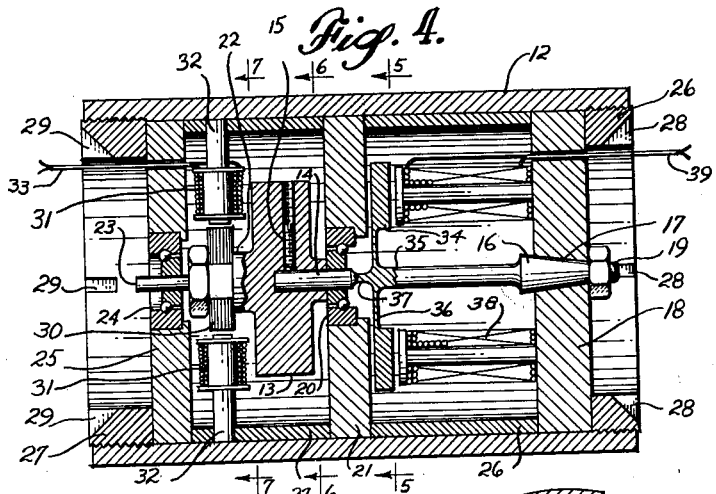
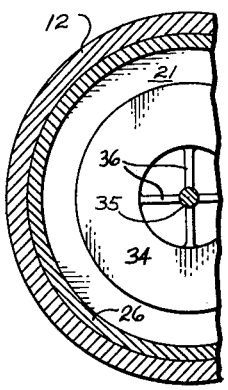
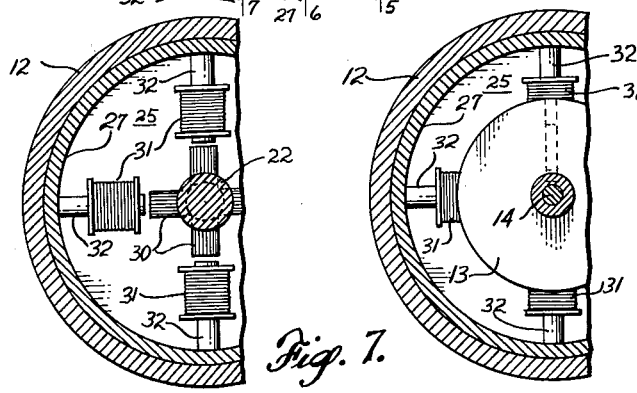
INVENTOR.
ERLE W. MALONE
BY
*Robert W. Black*
ATTORNEY March 24, 1964 E. W. MALONE 3,125,885
MECHANICAL ACCELERATION RETARDER
Filed Jan. 3, 1961 2 Sheets-Sheet 2
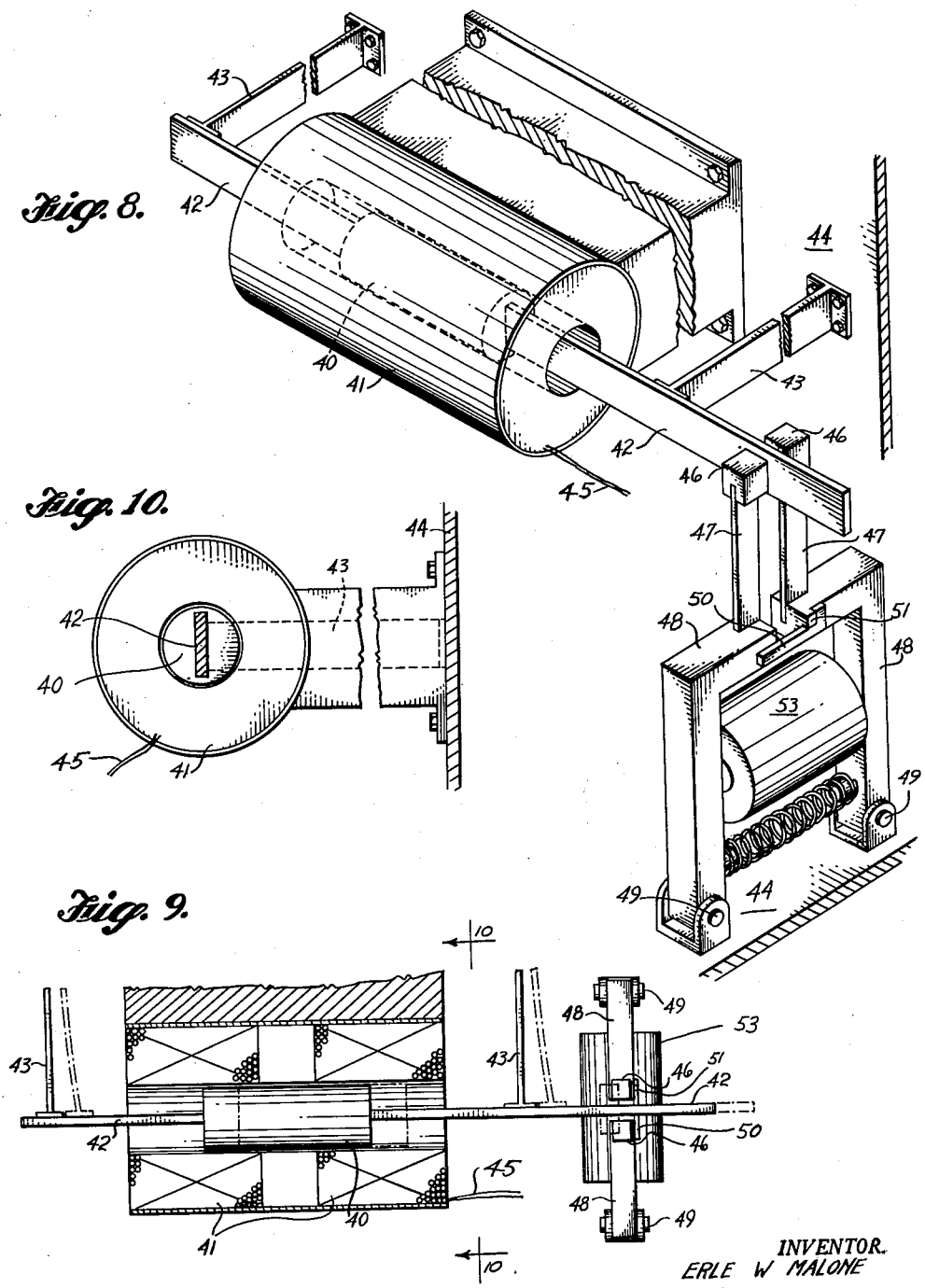
INVENTOR.
ERLE W MALONE
BY
ATTORNEY

United States Patent Office 3,125,885
Patented Mar. 24, 1964

3,125,885
MECHANICAL ACCELERATION RETARDER
Erle W. Malone, Seattle, Wash., assignor to Boeing Airplane Company, Seattle, Wash., a corporation of Delaware
Filed Jan. 3, 1961, Ser. No. 80,422
5 Claims. (Cl. 73—517)

The present invention relates to a retarder for reducing and preferably eliminating the acceleration in the relative movement between an inertia mass and its support. Such retarders may be utilized in accelerometers of either the linear or angular type, in rate gyroscopes, in velocity sensing devices, or even in resilient mounts for isolating from shock an object supported by such a mount. Such a retarder may be used either to retard relative displacement of two objects away from a normal relationship, or to control relative movement of two articles during their return to an initial relationship so that the velocity of such return movement will approach a constant value and will not accelerate appreciably so as to cause the momentum of one part to effect appreciable relative movement of the parts beyond such initial relationship.

The operation of retarding or damping relative movement of an inertia mass and its support is not new, but usually this retarding action has been effected by a hydraulic viscous damper which has relied upon the viscosity of liquid in a container to impede the movement of a member through it, or to impede movement of the liquid through an aperture. Such hydraulic viscous dampers have been incapable of providing uniform retarding action under widely different temperature conditions. The viscosity of virtually all liquids is reduced by a substantial increase in temperature and increased by a substantial decrease in temperature from what might be considered normal operating temperatures in the range of 60 degrees Fahrenheit to 80 degrees Fahrenheit. The change in viscosity effected by a given change in temperature will, of course, vary from liquid to liquid, but at least for most liquids either the change in viscosity is appreciable where the temperature is increased or decreased 100 degrees Fahrenheit, or the liquid vaporizes or solidifies.

A principal object of the present invention is to provide a retarder of mechanical type which will provide virtually the same retarding action between an inertia mass and its support irrespective of changes in temperature in any amount.

A further object is to provide such a retarder which will exert a virtually constant action so as to minimize the effect of acceleration forces on the relative movement of the inertia mass and its support. Such relative movement will therefore approach constant velocity throughout the range of movement. Moreover, the retarder will be equally effective in any attitude or position of the retarder, inertia mass or its support, and throughout any relative movement of such mass and its support. The structure of the retarder can be designed or adjusted to provide the desired degree of retarding force.

It is also an object to provide retarders of different types to be combined with different arrangements of inertia weights and their mountings, all of which employ the same principle of operation.

In various forms which the retarder may take, it is an object to employ light, simple and economical structure which can be designed to be assembled and dismantled readily. While such a retarder is compact it is not likely to be damaged and consequently will be reliable in operation.

The foregoing objects can be accomplished by providing a mechanical retarder for checking or periodically applying a restraining force between an inertia mass and its support. Such an inertia mass ordinarily is connected to its support by a spring mount which will be distorted by sudden movement of the support while the inertia mass maintains a condition of rest or constant and uniform motion. Disturbance of the relationship between the inertia mass and its support will distort the connecting spring and the retarder of the present invention will act either to reduce the acceleration of the inertia mass and support components away from their initial relationship, or will reduce the acceleration of the return movement of such components toward their initial relationship effected by the restorative force produced by the stress in the spring mount connecting the inertia mass and its supporting structure. Such retarder includes a mount on one of the components of the inertia weight and support, a contact member to engage the other component and resilient means connecting the mount and contact member which are more limber or flexible than the spring connection between the inertia mass and its support. Intermittently operating or periodically energized mechanism is then provided to effect successive momentary engagements of the contact member with the inertia weight or support component which it is arranged to engage. The action of such engagement will be to retard the relative acceleration of the inertia weight and support components so that their relative velocity will approach uniformity and the frequency of engagement by the contact member can be selected or regulated to accomplish this result. The relative displacement of the inertia weight and its support can be indicated by a suitable indicator and such displacement may be utilized to initiate operation of the retarding mechanism.

FIGURE 1 is a top perspective view of an angular accelerometer to which the present invention is applied.

FIGURE 2 is a fragmentary plan of a portion of the mechanism shown in FIGURE 1, and FIGURE 3 is a similar view showing parts in a different operative position.

FIGURE 4 is a longitudinal section through a different type of angular accelerometer.

FIGURE 5 is a transverse section through the angular accelerometer shown n FIGURE 4 on line 5—5 of that figure with part of the section broken away.

FIGURE 6 is a similar section on line 6—6 of FIGURE 4 and

FIGURE 7 is a similar section on line 7—7 of FIGURE 4.

FIGURE 8 is a top prespective view of a linear accelerometer to which the invention is applied.

FIGURE 9 is a longitudinal sectional view through the accelerometer shown in FIGURE 8, and FIGURE 10 is a transverse section on line 10—10 of FIGURE 9.

While the present invention is applicable to various types of devices incorporating an inertia mass and a support for such mass interconnected by a stiff spring, the nature of the invention can be illustrated conveniently by its application to representative accelerometers of different types. In this specification, therefore, the application of the retarder in different forms to two angular accelerometers and one linear accelerometer is illustrated. In each instance the support for the inertia weight will be displaced while the weight remains virtually at rest, and the spring interconnecting the support and inertia mass will be distorted and stressed so that it will produce a restorative force. The retarder of the invention then serves to check the relative movement of the support and inertia mass during their return to their initial relationship in a manner such that the velocity of the return movement approaches a constant value.

The angular accelerometer shown in FIGURE 1 includes the inertia mass disk 1 which is connected by the mounting spring 2 to the inertia weight support casing 3. Such spring is connected to the center of the mass disk 1 and extends axially of it. The spring is of the torsion type, preferably being composed of intersecting leaf springs disposed in mutually perpendicular planes. When the support casing 3 is suddenly displaced angularly relative to the inertia mass 1 about the axis of the mass disk, such disk will remain virtually at rest while the spring 2 will be torsionally distorted and consequently stressed to produce a restorative force tending to move the inertia weight disk 1 and the support 3 relatively in the direction opposite their direction of relative displacement.

Whether the inertia disk 1 is moved relative to the support 3, or the support 3 is returned relative to the inertia disk by the force stored in the distorted spring 2, the tendency in either case will be for the restoring movement to be accelerated as it progresses. The speed of the moving component, or components, of the inertia mass and support combination will therefore continue to increase if unchecked until the distortion of the spring 2 has been relieved completely. Under these conditions one or both components of the mass and support system will have gained such momentum that they will continue to move relatively past their initial relationship so that the spring 2 will become distorted in the opposite direction. After the components have passed the condition in which the spring 2 is unstressed the kinetic energy of the components will be transformed into potential energy stored in the reversely distorted spring and the movement will decelerate until the components again come to a stop.

The stored energy of the distorted spring will then effect relative movement of the inertia mass 1 and support 3 about the axis of the disk in the first relative angular direction of these components which occurs as the distorted spring again seeks to move these components relatively into their initial relationship. Once more the relative movement of the components is accelerated until the spring 2 is unstressed whereupon the momentum of the system will continue such relative movement of the parts in the same angular direction to distort the spring in the manner it was first distorted by relative displacement of the components. Such oscillation of the mass and support components would continue until the energy produced by the first relative movement of the support and inertia weight has been dissipated within the spring 2 in the absence of external interference.

Under some circumstances, such as when it is desired to measure only the initial displacement of the support relative to the inertia weight, it is preferred to arrest the movement of the weight and support components when they have been restored to their initial relationship instead of them passing beyond such relationship to distort the spring 2 in the opposite sense. In order to effect this result it is necessary to remove energy from the mass and support system during the restorative movement so that the energy of initial displacement has been dissipated completely by the time the components have been restored to their initial relationship. Also, it is preferable that such energy be removed from the weight and support system progressively throughout such movement so that the velocity of relative movement of the components during such restoration approaches uniformity.

Conventionally, the acceleration of the relative movement of the mass and its support during such restorative movement has been retarded by a hydraulic viscous damper, as has been mentioned previously, but such damper has been incapable of providing a constant degree of retardation under widely different conditions of temperature. The retarder of the present invention effects a mechanical engagement between the mass and mass support components which is applied periodically to check the relative movement of the mass and support components so as repeatedly to remove from the mass system increments of energy to restrict relative movement of the components virtually to a constant velocity.

The retarder shown in FIGURES 1, 2 and 3 includes a finger 4 periodically engageable with the exterior of a flange 5 projecting axially from the mass disk 1 adjacent to its periphery so that it will have the maximum linear movement relative to the support 3. This finger is supported resiliently relative to the support 3 such as being mounted on the end of a leaf spring 6. The finger is actuated for periodic engagement with the flange 5 of the mass disk by reciprocating the spring 6 lengthwise by a solenoid actuator 7 which is secured to the inner side of the top of the support casing 3 by one or more screws or rivets 8. The solenoid is thus fixed to the mass support component and is operable to effect intermittent engagement of the finger 4 with the inertia mass component.

The frequency with which the finger 4 is moved into engagement with the mass flange 5 and the duration of the contact will depend upon the frequency with which the solenoid 7 is energized and the duration of each period of energization. When the solenoid is deenergized the spring 9 will urge the plunger 10 to which the spring 6 is attached to the left, as seen in FIGURES 1 and 2, until the end of such plunger engages the stop plate 11 mounted on the end of the solenoid. When the solenoid is energized the plunger 10 will be drawn to the right, as seen in FIGURES 1 and 2, so that the finger 4 will move from the solid line position of FIGURE 2, or the broken line position of FIGURE 3, to the right to engage the inertia disk flange 5. If this flange is turning in the direction indicated by the arrow in FIGURE 3, the engagement of the finger with it will cause the finger to be displaced to bend the supporting spring leaf 6 in the direction shown in full lines.

Preferably, the characteristics of the spring leaf 6 should be such that a substantial force will be required to bend it. Also, the finger should travel with the disk flange a sufficient distance to bend the spring a considerable amount. The resistance of the spring leaf to bending will therefore apply to the disk flange a retarding force increasing progressively with the degree of bend of the spring and over a distance which the finger travels effected by movement of the disk flange. By the application of such force to the leaf spring 6 kinetic energy will have been removed from the inertia mass and support system, and converted into potential energy of the flexed spring leaf 6. The amount of energy thus removed from the inertia mass and support system can be doubled by making the solenoid 7 double-ended extending diametrally of the inertia mass disk 1 as shown, and having oppositely movable plungers, spring leaves and engaging fingers at its opposite ends for simultaneous engagement of the two fingers with the inertia disk flange 5 each time the solenoid 7 is energized.

It is preferred that the solenoid 7 be deenergized prior to the time that the spring leaf 6 reaches its position of maximum bend so that the rotation of the inertia disk will not be stopped, nor will the disk rim 5 slide appreciably relative to the finger 4. The characteristics of the spring leaf 6 should be such that while the spring leaf is sufficiently flexible, or limber, to be bent through a substantial angle, the spring leaf should be strong in the sense that a substantial force will be required to produce such bend and when the spring leaf is moved outward by spring 9 to retract the finger 4 from engagement with the disk flange 5, the spring 6 will vibrate very briefly at high frequency to dissipate the energy which it has received from the flange 5 by its flexing to restore the spring to its unstressed condition.

The solenoid 7 should remain deenergized until the spring 6 has almost recovered its unstressed condition, whereupon the solenoid can be reenergized to engage the finger, or fingers, 4 again with the inertia mass flange 5. The period of solenoid deenergization should, of course, not be sufficient to enable the relative movement of the inertia mass and support components to be accelerated apperciably by the force of spring 2 before the finger 4 is reengaged with the mass flange. On the other hand, it would be undesirable to reengage the finger 4 with the flange appreciably before it had been restored to its unstressed condition. If such finger should engage the flange 5 while the spring 6 is bent appreciably in the direction opposite that in which the flange 5 was turning, the tendency of the finger 4 would be to be moved by the spring 6 in the direction of the flange 5, thus tending to increase its movement momentarily, rather than decreasing it. If the finger should engage the inertia weight flange while it was in its midposition but moving in the same direction as the flange, again the tendency of the finger engaging the flange would be to increase its movement rather than to decrease it. On the other hand, if the spring 6 should have swung again toward the full line position of FIGURE 3 at the time the finger 4 is engaged with the flange, the amount of travel of the finger 4 with the flange before it should again be released would be reduced.

Of course, it would be desirable to time reengagement of the finger 4 with the disk flange 5 at the time that the spring leaf had moved from its position of maximum flexure effected by engagement with the flange 5 back to its unstressed condition but with the finger 4 being moved in the direction opposite the movement of the flange 5. In that instance the kinetic energy of the spring leaf and finger would be exerted in the direction opposite the direction in which the kinetic energy of the inertia mass and mass support is acting so that a larger amount of energy would be removed from the inertia mass and support system by both the action of stopping the finger 4 and again bending the spring leaf in the sense opposite that in which it was moving at the time of reengagement of the finger 4. This situation would represent the preferred coordination of the timing of energization and deenergization of the solenoid 7 with the vibratory characteristics of the spring leaf 6.

It will be evident that in order to enable the finger 4 and its supporting leaf spring 6 to remove kinetic energy from the inertia mass and support components in increments such as to maintain the velocity of such components generally constant during their restorative movement, it will be necessary for the solenoid actuator 7 to be energized and deenergized very rapidly. Such solenoid might, for example, be energized and deenergized several times a second, indicating the speed with which movement of the spring leaf 6 must occur after finger 4 is released from flange 5. Also, it will be evident that because of these characteristics of the retarder it will be undesirable to have the solenoid 7 operating during initial relative displacement of the inertia mass and its support 3. Consequently, suitable mechanism should be provided for initiating operation of the solenoid actuator the instant that the inertia mass and suport components have reached their condition of maximum displacement from unstressed condition of the connecting spring 2 and they have begun their relative restorative movement. A voltage generating indicator connected between the inertia mass disk 1 and the support 2 can serve the dual function of indicating the maximum relative displacement of these components during a given operation of the device and initiate the energization of the solenoid 7.

In FIGURES 4, 5 and 6, a somewhat different type of angular accelerometer is shown. In this instance the mechanism is all received within a cylindrical casing 12 constituting part of the support for the inertia mass disk 13. This mass is secured to one end 14 of a torsion shaft by a set screw 15. The opposite end portion 16 of such torsion shaft is tapered toward its end complementally to the taper of an aperture 17 in a mounting plate or partition 18 which is slidably received in the casing 12. A nut 19 can be screwed onto the threaded end of the torsion shaft to draw its tapered end portion tightly into engagement with the aperture 17 so as to anchor this end portion of the torsion shaft rigidly with the plate 18.

The torsion shaft is not mounted in cantilever fashion as is the spring mounting 2 of the angular accelerometer shown in FIGURES 1, 2 and 3, but an antifriction bearing 20 encircling the torsion shaft adjacent to the inertia weight 13 is mounted in a central aperture in a partition plate 21 slidably received in the casing 12. It is preferred that the inertia mass 13 not even be supported in cantilever fashion on the end portion 14 of the torsion shaft, but that such mass include a projection 22 extending axially from the mass disk opposite the side in which the torsion shaft end 14 is received and that such projection have a reduced end portion 23 concentric with the disk forming a stub shaft mounted in an antifriction bearing 24 which is received and supported in a central aperture in a mounting plate 25, also slidably received in the casing 12.

The plates 18 and 21 are accurately spaced apart axially by a spacer sleeve 26 slidably received within the casing 12 and interposed between these plates. Similarly, the plates 21 and 25 are spaced apart accurately by a sleeve 27 which is interposed between them and slidably received in the casing 12. The plates and sleeves are secured firmly within the casing by externally threaded clamping rings 26 and 27 in internally threaded opposite end portions of the casing 12. The inner peripheries of these ring ends may have in them notches 28 and 29, respectively, spaced circumferentially around the rings for engagement by suitable wrenches to screw the rings tightly in place for clamping together the components assembled between them.

The antifriction bearings 20 and 24 in which the torsion shaft portion 14 and the stub shaft 23 are mounted respectively, support the inertia mass 13 and the mass support including the casing 12 and plate 18 for relative angular movement. These components are connected by the resilient torsion shaft having end portions 14 and 16 which can be turned relative to each other to effect torsional distortion of the shaft. The degree of relative angular movement between the inertia mass 13 and its supporting structure can be measured conveniently by a voltage generating indicator, including cooperating elements mounted respectively on the inertia mass component and on the mass supporting component. Such generator may include an armature mounted on the projection 22 of the inertia mass disk and having radially projecting poles 30 which may, for example, be spaced apart angularly 90 degrees. This armature turns within the field of field coils 31 spaced circumferentially around the casing and projecting radially inward from it. Each of these field coils is mounted on a radially extending post 32 anchored in the spacer sleeve 27, as shown in FIGURE 4. The field coils 31 are connected together electrically and leads 33 are connected to a sensitive voltmeter or other suitable indicator showing the generation of a voltage in the field coils 31 corresponding to the degree of relative angular displacement of the inertia mass disk 13 and its supporting structure.

If the casing 12 as part of the supporting structure is suddenly displaced angularly about the axis of the torsion shaft, the inertia mass 13 will remain virtually at rest and the torsion shaft will be twisted between its end portions 14 and 16 to an extent depending upon the relative angular displacement of the inertia weight and support components. The degree of such displacement will be indicated by the voltage generating indicator described above. As soon as such angular disturbing force ceases the stresses produced by the twisting of the torsion shaft will initiate opposite relative movement of the inertia mass 13 and the mass support to restore these components to their initial angular relationship. Retarder mechanism of the present invention is incorporated in this device for the purpose of retarding acceleration of the components toward such initial position so that their relative movement can be arrested when the torsion shaft has been unstressed and the inertia mass and support components have reached their initial relationship.

In this type of angular accelerometer an element of the retarding mechanism in the form of the flat ring 34 is mounted on the central portion 35 of the torsion shaft interconnecting the mass disk 13 and the supporting structure. Such ring is mounted on the shaft by resilient spokes 36 which are very flexible and easily bent lengthwise of the torsion shaft and less readily bent circumferentially of the shaft. In addition, it is preferable to provide a section of the torsion shaft 37 between the mass supporting end 14 and the central ring supporting portion 35 of the shaft of considerably smaller cross-sectional area than the remainder of the torsion shaft, so that over this short length of shaft it will twist much more easily than the remainder of the shaft.

A plurality of electromagnets 38 are mounted on the plate 18 within the casing 12 arranged in circumferentially spaced relationship and having their holes disposed adjacent to the ring 34. Energization of such electromagnets will attract this ring which will be made of magnetizable material and clamp the ring against the pole pieces of the electromagnets so that the ring cannot turn. The material of this ring should be readily demagnetizable, as well as magnetizable, such for example as being made of soft iron. When the electromagnets are energized to attract the ring 34, it will be displaced somewhat axially of the torsion shaft to engage the pole pieces of the magnets and the resilient spokes 36 will be bent to permit such movement. As soon as the electromagnets are deenergized, the ring 34 will be demagnetized and the resilience of the spokes 36 will shift the ring away from the pole pieces of the electromagnets so that the ring may again turn with the central portion 35 of the torsion shaft.

When the electromagnets 38 are energized to clamp the ring 34, it is preferred that the mass disk 13 not be stopped in its restorative movement, but that its rotation toward its restored or initial relationship to the support component simply be retarded so as to minimize the acceleration toward such relationship. It is therefore necessary for relative movement between the mass and mass support components to be able to be continued despite fixation of the ring 34 relative to the mass support. Such continued relative movement of the inertia mass disk and support components can be effected by angular yielding of the central portion 35 of the torsion shaft relative to the end portion 14 supporting the mass disk by local twisting of the shaft portion 37, or by circumferential bending of the ring spokes 36 or both.

If kinetic energy were to be removed from the inertia mass disk and its support by bending of the spokes 36 interruption of movement of the ring 34 relative to the electromagnets 38 by their energization would cause a bending force to be applied to the spokes by the central portion 35 of the torsion shaft and upon release of such ring by deenergization of the electromagnets the ring would be moved relative to such shaft portion by the stress thus produced in the bent spokes. When the oscillation of shaft 34 produced by the stress in the spokes has been dissipated, or when the spokes have returned to their straight condition and the ring is moving relative to the magnets 38 in the same direction that the central portion 35 of the torsion shaft is twisting relative to the casing 12, the electromagnets can be energized again to exert a further checking action on the acceleration of the inertia mass disk and its support which the stressed torsion shaft tends to produce.

Alternatively, if the spokes 36 are virtually rigid circumferentially and are flexible only axially of the torsion shaft, engagement of the ring 34 with the pole pieces of the electromagnets 38 would remove kinetic energy from the inertia mass and support system only to the extent that such energy was dissipated by sliding of the ring on the pole pieces to retard rotation of the central portion 35 of the torsion shaft relative to the casing 12, or to the extent that the kinetic energy is dissipated by oscillatory twisting of the reduced portion 37 of the torsion shaft. If the ring 4 were simply clamped to the pole pieces of the electromagnets 38 by their energization momentarily, relative rotational restorative movement would continue between the inertia mass disk and the support by virtue of the torsional distortion of the reduced portion of the torsion shaft 37 even though movement of the central portion 35 of the torsion shaft relative to the support were arrested. Upon release of the ring 34 by deenergization of the electromagnets 38, the greater stresses in the central portion 35 of the torsion shaft would cause this portion of the shaft to rotate relative to the support 12 faster than the end portion 14 of the shaft, thus restressing the torsion shaft portion 37 of reduced cross section. When the ring 34 again is stopped by a further periodic energization of the electromagnets 38, such restored stresses in the torsion shaft portion 37 will continue the relative rotational movement of the inertia disk and its support.

Because of the intermittent engagement of the ring 34 and magnet pole pieces 38, it will not be possible for the stresses accumulated in torsion shaft 35 to effect appreciable acceleration between the inertia mass disk and the disk support components and consequently, the restorative relative movement of these components will occur at virtually a constant velocity. It will be appreciated that such acceleration retarding action may be accomplished by any one or a combination of the checking actions of the reduced shaft section 37, the circumferential bending of spokes 36 and the frictional engagement with relative circumferential movement between the ring 34 and the pole pieces of the electromagnets 38. Also, of course, the degree of retarding action will be affected by the frequency with which the electromagnets are energized and the duration of each such period of energization.

When the apparatus shown in FIGURES 4, 5, 6 and 7 is used as an angular accelerometer, it will be undesirable to energize the electromagnets 38 during the initial relative displacement of the inertia mass and mass support components. The maximum angular movement thus effected will be indicated by the voltage generated by the relative rotation of the poles 30 of the spider armature and the field coils 31 actuating a suitable indicator to which they are connected by the wires 33. When relative return movement of the inertia mass disk and disk support components is initiated, the displacement indicator can actuate suitable control mechanism to energize the electromagnets 38 by supplying electric current to their supply leads 39 and such control mechanism can continue to energize the electromagnets periodically in accordance with a predetermined pattern until the inertia mass and support components have been restored to their initial relationship and the stresses in the torsion shaft have been relieved.

In FIGURES 8, 9 and 10 linear accelerometer mechanism is illustrated to which an acceleration retarder in accordance with the present invention has been applied, which operates on the same principle as the retarders discussed in connection with the angular accelerometers described above. In this instance the inertia mass is the plunger 40 received within the solenoid 41. Such inertia mass is guided for axial movement relative to the solenoid or coil 41 by the bar 42 on which the plunger is mounted and which in turn is mounted on the swingable ends of leaf springs 43, the opposite ends of which are secured to the inertia mass support 44. The leads 45 from the coil 41 will be connected to suitable generated voltage indicating mechanism such as a sensitive voltmeter.

When the support 44 is subjected to an abrupt linear acceleration, or an acceleration having a linear component, the inertia mass plunger 40 will remain virtually at rest while the support 44 and coil 41 are displaced axially of the coil relative to such mass. The spring leaves 43 connecting the bar 42 and the support will be bent correspondingly and such distortion will produce stresses in such springs tending to move the bar 42 in a direction to restore the original relationship between the inertia mass 40 and the support 44. Movement of the coil 41 relative to the plunger 40 will have created a voltage in the coil actuating the indicator to which the leads 45 are connected, so as to indicate the degree of relative displacement of the support and the mass 40. The intensity of the restorative force produced by the springs 43 will, of course, depend upon the extent of such relative displacement of the inertia mass and support components.

If the relative movement of the inertia mass 40 and the support 44 were not checked in any way the restorative force produced by the spring leaves would accelerate the return relative movement of these components so that when they had been restored to their initial relationship they would have a momentum which would carry them past that relationship. By retarding the acceleration the velocity of the relative movement between the inertia mass and mass support components can be made virtually uniform and the relative movement of such components can be arrested when they have reached their initial relationship without appreciable overtravel. This result can be accomplished by periodically checking the relative return movement of bar 42 and support 44 by applying to such bar an intermittent force opposing such relative return movement.

A retarder suitable for accomplishing this purpose is shown as including a pair of bar-engaging fingers 46 disposed on opposite sides of the bar and engageable with an end portion of the bar projecting beyond one of the supporting spring leaves 43. Such fingers are carried by leaf springs 47 respectively mounted on the swinging ends of angle arms 48 which are mounted for swinging about axes parallel to the bar 42 by pivots 49. Spreading movement of the fingers 46 is limited by suitable stop means such as a hook 50 carried by one arm 48 which engages a stop lug 51 mounted on the swinging end of the other arm. These arms are normally urged into their limiting separated position by a compression spring 52 interengaged between the arms.

To bring the fingers 46 into engagement with opposite sides of the bar 42, an electromagnet 53 is mounted on one of the arms 48 in a location disposed between such arms so that it will attract the other arm when it is energized. As the arms 48 swing toward each other to press the fingers 46 against opposite sides of the bar 42, such fingers will be moved relative to the support 44 on which the arm pivots 49 are mounted so that the leaf springs 47 will be bent longitudinally of the bar 42. The degree of bend will depend upon the duration of energization of the electromagnet 53 and such bending of these spring leaves will produce a force on the bar opposing relative restorative movement between the inertia mass 40 and the support 44.

When the electromagnet 53 is deenergized the stresses within the spring leaves 47 will be dissipated rapidly by vibration of such springs unless the electromagnet again is energized before such stresses have been dissipated. To increase the retarding action it would be advantageous to reenergize the electromagnets when the springs 47 had moved into their original position and the fingers 46 were moving in a direction relative to the bar 42 opposite the movement of such bar relative to the support 44 produced by the leaf springs 43.

It will be evident that in the linear accelerometer shown in FIGURES 8, 9 and 10, as in the angular accelerometers described previously, the intensity of the retarding or checking action will depend upon the duration of energization of the electromagnet during each period and the frequency of such energization. Such duration and frequency should be selected so that the relative movement between the inertia mass 40 and the coil 41 from the broken line position in FIGURE 9 to the solid line position, for example, will be such that the relative velocity of these components will be approximately uniform and the components will have virtually no overtravel after they have reached their initial relationship. Also, the application of the retarding force can be initiated by control mechanism for the solenoid 53 energized by the indicator to which the leads 45 of coil 41 are connected at the time the inertia mass and support have reached their maximum relative displacement and return movement of the components by the spring leaves 43 is being initiated. Conversely, the periodic energization of electromagnet 53 can be terminated by the control mechanism when the indicator shows that the inertia mass and support components have been restored to their initial relationship and the stresses in springs 43 have been relieved completely.

I claim as my invention:

1. A mechanically retarded inertia mass and support combination, comprising inertia mass and support components relatively displaceable by inertia upon being subjected to an acceleration and resiliently urged toward their initial relationship, engaging means engageable with one of said components, spring means connected to the other of said components and supporting said engaging means resiliently, electromagnetic means rapidly operable periodically alternately to engage said engaging means with and to release them from the component with which they are engageable for checking relative movement of said components, and a voltage generating indicator operated by relative movement of said inertia mass and support components, operatively connected to said electromagnetic means and operable to initiate operation of said engaging means as relative movement of said inertia mass and support components toward their initial relationship occurs.

2. A mechanically retarded inertia mass and support combination, comprising relatively rotatable weight disk and support components relatively displaceable by inertia upon being subjected to an acceleration and resiliently urged toward their initial relationship, said weight disk component having a flange projecting axially therefrom, torsion spring means connecting said components and operable to effect relative movement of said components for restoring them to an initial relationship following relative displacement thereof, and retarding means for checking acceleration of such relative movement between said weight disk and support components effected by the restorative force of said torsion spring means and including a finger engageable with said weight disk flange, leaf spring means connected to said support component and supporting said finger resiliently, a solenoid mounted on said support component and disposed diametrally of said weight disk component adjacent to its flange and a plunger reciprocable by said solenoid and carrying said leaf spring means for supporting said finger in a position for engagement with said weight disk flange, said solenoid being rapidly energizable periodically to move said plunger alternately to engage said finger with and to release it from said support component for checking relative movement of said components.

3. A mechanically retarded inertia spring mass and support combination, comprising relatively rotatable weight disk and support components relatively displaceable by inertia upon being subjected to an acceleration and resiliently urged toward their initial relationship, a torsion spring rod connecting said weight disk and support components and operable to effect relative movement of said components for restoring them to an initial relationship following relative displacement thereof, and retarding means for checking acceleration of such relative movement between said weight disk and support components effected by the restorative force of said torsion spring rod including a ring, leaf spring means connecting said ring and said torsion spring rod for supporting said ring from said rod and electromagnetic means mounted on said support component adjacent to said ring, rapidly operable periodically alternately to magnetize a portion of said support component for engagement by said ring upon energization of the electromagnetic means, and deenergizable for release of said ring from said support component, for checking relative movement of said components.

4. A mechanical retarder for retarding acceleration of relative movement between inertia mass and support components, comprising a member reciprocable to engage one of such components, a solenoid carried by the other of such components, a plunger received in and reciprocable by said solenoid, and leaf spring means supporting said member from said plunger bendable for movement of said member in one direction transversely of the direction of reciprocation of said plunger when said member is engaged with the component with which it is engageable by energization of said solenoid and bendable oppositely for return of said member by said spring means in the opposite direction transversely of the direction of reciprocation of said plunger when it is released from such engagement with such component by deenergization of said solenoid.

5. A mechanically retarded inertia mass and support combination, comprising relatively rotatable inertia mass and support components, a torsion spring rod connecting said components and operable to effect relative angular movement of said components for restoring them to an initial relationship following relative angular displacement thereof, and retarding means for checking acceleration of such relative angular movement between said inertia mass and support components by the restorative force of said torsion spring rod including a member mounted on said torsion spring rod and angularly movable thereby and means carried by said support component adjacent to said member and operable to check movement of said member for checking relative movement of said components, said torsion spring rod having a portion of reduced cross section between said inertia mass component and said member for reducing the resistance of said torsion spring rod to relative angular movement of said member and said inertia mass component.

References Cited in the file of this patent

UNITED STATES PATENTS

| | | |
|---|---|---|
| 2,185,313 | Reimuller | Jan. 2, 1940 |
| 2,210,970 | Bonell | Aug. 13, 1940 |
| 2,266,014 | Erickson | Dec. 16, 1941 |
| 2,368,002 | Cooper | Jan. 23, 1945 |
| 2,656,519 | Sheppard | Oct. 20, 1953 |
| 2,950,784 | Hertel | Aug. 30, 1960 |